UNITED STATES PATENT OFFICE.

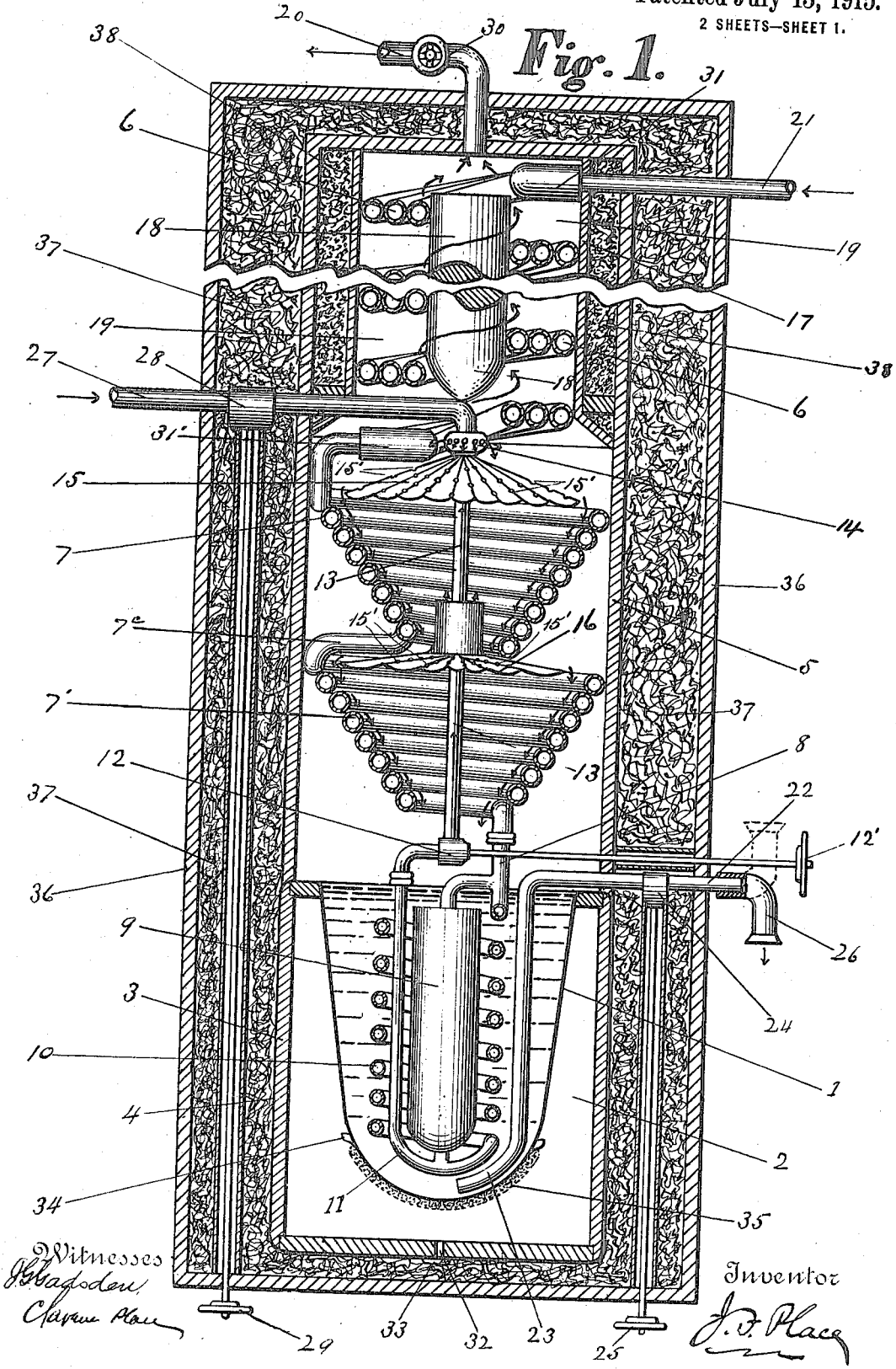

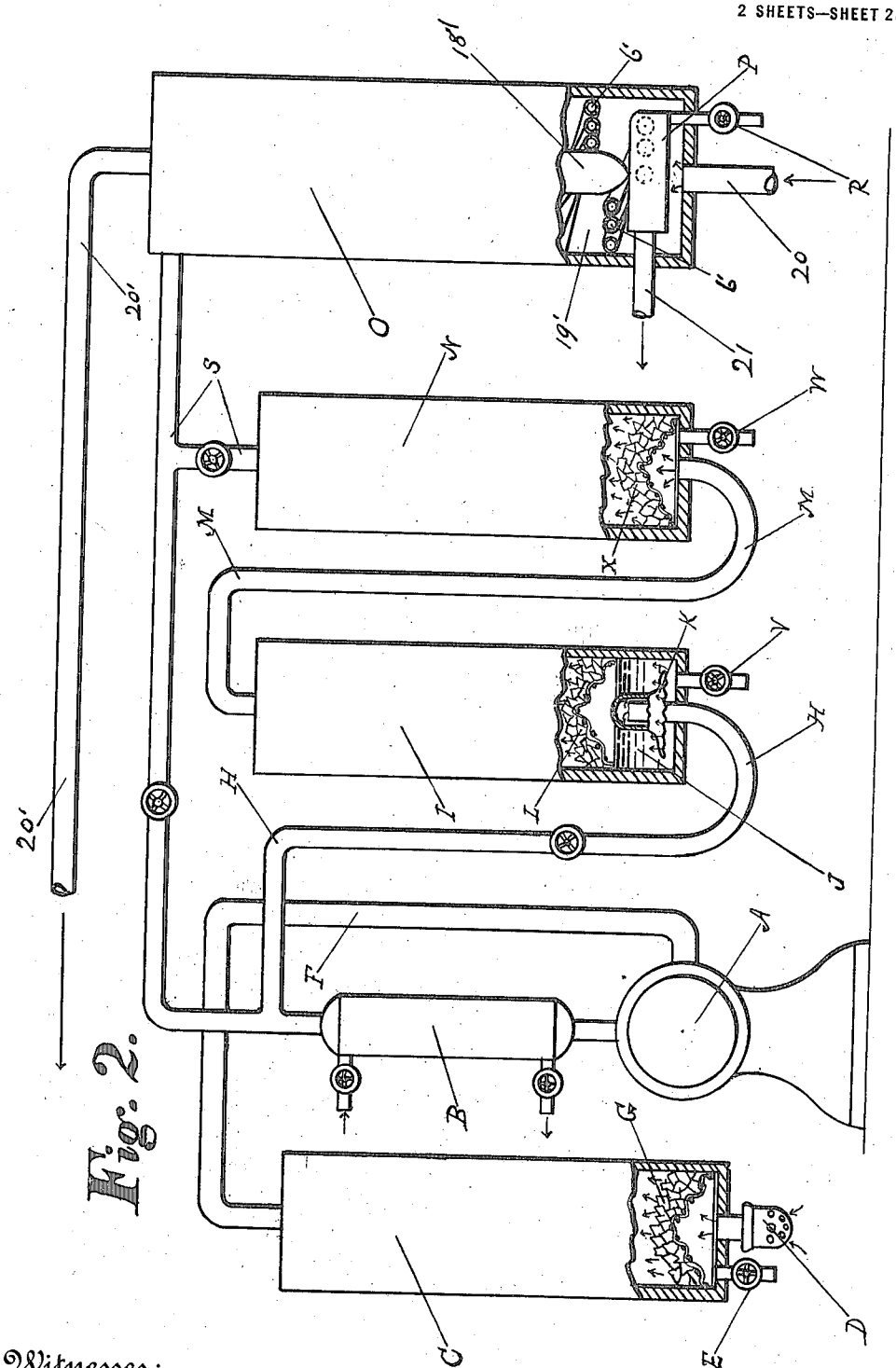

JAMES F. PLACE, OF GLEN RIDGE, NEW JERSEY, ASSIGNOR TO AMERICAN AIR-LIQUEFYING COMPANY, OF NEW YORK, N. Y., A CORPORATION OF NEW YORK.

AIR LIQUEFIER AND SEPARATOR.

1,146,020.             Specification of Letters Patent.      Patented July 13, 1915.

Application filed January 2, 1908. Serial No. 409,011.

*To all whom it may concern:*

Be it known that I, JAMES F. PLACE, a citizen of the United States, and a resident of Glen Ridge, in the county of Essex and State of New Jersey, have invented certain new and useful Improvements in Air Liquefiers and Separators, of which the following is a specification.

My invention relates to mechanism or apparatus for liquefying air and for the separation of liquid air by fractional distillation into its constituent elements, nitrogen and oxygen; and more especially for producing nitrogen gas and oxygen liquid.

The object is to liquefy and separate air cheaply in one operation.

When used as a separator only, the result sought is to separate liquid air, regardless of the proportions of its constituents, with the least expenditure of energy, so as to produce in a high degree of purity oxygen liquid and nitrogen gas.

When used as a liquefier and separator, the air used is compressed to substantially its critical pressure, and no supply of liquid air from an outside source is required after the apparatus is charged with an initial charge. After being charged with such initial charge of liquid air, the utilization of the latent heat of vaporization of such charge and successive charges, at a relatively low pressure, to liquefy air at substantially its critical point when there is no latent heat of condensation, will continue to operate the apparatus, in accordance with the process described in my application Serial No. 404,244.

There are several patents for separating the gases, or for separating liquid air into its constituent gases, such for instance as No. 749,040 Dumars, No. 795,525 Linde, and No. 683,492 Pictet. But my invention is for producing practically pure liquid oxygen, and practically pure nitrogen gas—the first in liquid form and the latter in gaseous form. The advantage of getting the oxygen in the liquid state, is that it can be more easily handled commercially, and by evaporation in a closed receptacle it will compress itself.

When used as a separator only compressed air of relatively low compression (three or four atmospheres) is used as the means of separation. In such operation the separating apparatus herein described is especially adapted for use in conjunction with my improved apparatus for liquefying air, shown in Patents No. 895,192 and No. 918,468.

The object sought I attain by the means and in the manner hereinafter described, reference being had to the accompanying drawings, in which—

Figure 1 shows my air-liquefying and liquid-air separating apparatus, in vertical section. Fig. 2 is a diagrammatic view, partly in vertical section, of the compressor and chemical drums for removing the moisture and carbonic acid gas from the air, preliminary to cooling and liquefying, or vaporizing therewith the liquid air to be separated into nitrogen gas and oxygen liquid.

Similar reference marks refer to similar parts through the drawings.

At A I show an ordinary air compressor, having the water cooler B for removing the heat of compression.

At C I have a drum charged with quicklime having a check valve inlet D, and a drain pipe and cock E. This drum is connected with the suction valves of the compressor through the suction pipe F; and as the air is drawn up through the several charges of lime G, some of the moisture and most of the $CO_2$ gas in the air is absorbed by the lime. From the water cooler B the compressed air is delivered through pipe H to the calcium chlorid drum I, and is passed first through a charge of calcium chlorid brine J, through the submerged strainer K, and thence through and in contact with the charges of lump calcium chlorid L in the drum. From this drum (I), the air passes through pipe M to the caustic potash drum N, and is passed through and in contact with the charges of lump caustic potash X. Nearly all the moisture and all of the $CO_2$ gas is absorbed from the air in passing through these drums I and N, and the air is ready to be cooled.

O is a nitrogen gas tank which takes the nitrogen gas from the interchanger delivery pipe 20 (see Fig. 1) before it has reached normal temperature and is utilized therein to do the first cooling of the compressed air. The compressed air from the potash drum (N) is delivered through pipe S (see Fig. 2) to the triple helical coils 6' in this pre-cooling nitrogen tank (O). These coils (6') at the lower end are provided with the drip box P to which is connected the compressed air feed pipe 21 which supplies the interchanger coils 6 (see Fig. 1) which will be referred to later. The box P has a drain cock R, to draw off any drip condensed from the air by preliminary cooling.

At the numeral 1 (see Fig. 1) I show a liquid gas evaporating holder or receptacle, preferably made of sheet metal, insulated from outside heat by the vacuum 2, which is surrounded by the non-conducting and non-collapsible fiber or wood case 3. Enveloping this rigid, wooden case I have the thin impervious envelop 4, preferably made of flexible metal, which is connected or joined at the top to the upper rim or edge of the receptacle 1, air-tight, so as to hold the vacuum 2—the envelop 4 and the receptacle 1 forming one complete air-tight inclosure. Fixed to the top of the envelop 4 and case 3, by an air-tight joint, I have the low-pressure conduit 5, which incloses the high-pressure triple thermal interchanger helical coils 6, (preferably made of light copper tubes), and the taper helical liquefying and vaporizing coils 7 and 7'. Two of these are shown only, in form of inverted cones connected together by the connecting pipe 7$^c$, but as many may be used as requisite. They are made preferably of thin seamless copper tubing, and the coils of each nest are laid close together so as to allow of no passage between them, the joints on the inside being filled with solder or other suitable material. The lower coil connects with the pipe 8, which is connected with and delivers to the liquefying drum 9, and the liquefying coil 10. The pipe 11 connects with the bottom of both the drum 9 and the coil 10, and through the liquid pressure-releasing valve 12 (operated by the hand wheel 12') with also the pipe 13, which has at the top the perforated discharging head 14, to which is also connected the delivery end of the liquid-air supply pipe, referred to later. At the top of the liquid air discharge pipe 13, and directly under the head 14, I have the liquid deflector or distributer 15, preferably scalloped in form of radial grooves as shown, and slightly convex on the upper side, and having numerous perforations 15' through the same in the edges or upper bend of the grooves, for passage of nitrogen gas up through the deflector without allowing the liquid in the grooves or on the upper surface of the deflector to escape through said perforations; and between the coil cones I have another similar deflector 16.

The longitudinal conduit or casing 5, above the helical inverted cones 7 and 7', has an interior lining 17, in the center of which is the core 18; and the construction is such that the triple helical compressed-air coils 6 just fill the annular space between the lining 17 and the core 18, thus forming the helical cooling passage 19 for the low pressure evaporated and expanding nitrogen gas. The outlet for the low pressure nitrogen gas is the pipe 20, which delivers to the pre-cooling drum O, (see Fig. 2) and to the nitrogen gas outlet pipe 20', through the helical passage 19' in the drum O around the core 18'. The coils 6 are fed from the inlet dry compressed air pipe 21 (see Figs. 1 and 2) which is supplied with compressed air, of suitable tension by the compressor A.

At 22 I show an oxygen liquid overflow outlet or delivery pipe, connected with the siphon tube 23, whose inlet end is inside and near the bottom of the liquid-air receptacle 1, controlled by the valve 24, which is operated by the outside hand wheel 25. The outer end of this delivery pipe 22, has a movable spout 26, which may be turned upward as shown by the dotted lines, and used as a filling spout to fill the vessel 1, if desired, with liquid air. The regular supply pipe for filling the evaporating receptacle 1 with liquid air, and supplying the same with liquid air for separation when the apparatus is used as a separator is shown at 27, controlled by the valve 28, which is operated by the outside hand wheel 29. This supply pipe (27) delivers to the strainer or perforated head 14 of the liquefied air pipe 13, preferably connected to the top of said head as shown; the other or inlet end of said supply pipe is connected with any outside source of supply of liquid air, or it may be connected with the overflow or liquid-air outlet of my air-liquefying apparatus, shown in Patents No. 895,192 or No. 918,468, and the delivery of liquid air to the evaporating vessel 1, may be controlled by the valve 28, either in separate and distinct charges, or continuously, as desired.

At 30 I have a valve in the nitrogen gas pipe 20, which by throttling, a pressure may be generated in the conduit 5, so as to force out the liquid oxygen through the siphon tube 23, from the receptacle 1 or regulate and maintain such pressure in conduit 5 and receptacle 1 as may be desired.

It will be seen that the compressed air inlet pipe 21 is connected through the headers 31 and 31' with the triple helical cooling coils 6 and inverted cone coils 7 and 7', or pipes coiled in shape or frustums of cones; and then successively through pipe 8 with the liquefying drum (9) and coils (10), and through valve 12 with the liquid discharge pipe (13) and the perforated head 14.

The vacuum 2 in the inclosure 4 and case 3 I produce by filling the case 3 with $CO_2$ gas through the aperture 32, which is afterward closed by the cap or plate 33. Then when the receptacle 1 is filled with liquid air, it quickly condenses the $CO_2$ gas in the case 3 to a liquid, which is caught in the annular cup 34. At 35 I have a gauze filled with charcoal, which at the low temperature of liquid air will absorb any trace of air which may be in the $CO_2$ gas—thereby producing the highest attainable vacuum possible, and which is the best possible insulator for the liquid in vessel 1 against circumambient heat. The whole is inclosed by the protecting outer case 36, and thoroughly insulated by the wool packing 37 and the eider-down insulation 38.

The operation of the apparatus when used as a separator only, is as follows: Compressed air (preferably at a tension of three or four atmospheres) is supplied to the apparatus by the compressor A (valve 30 being left open) and is delivered through the various hygroscopic drums after the heat of compression is removed, to the cooling coils 6' in the nitrogen pre-cooling drum O. From here, being practically dry and freed from $CO_2$ gas, it is delivered through pipe 21 (see Figs. 2 and 1) to the interchanger triple helical coils 6, the inverted cones 7 and 7' and the liquefying drum 9 and coil 10. Then the insulated receptacle 1 is filled with liquid air which it is desired to separate into oxygen liquid and nitrogen gas, preferably through pipe 27 and valve 28, either in intermittent charges, or continuously (being controlled by valve 28); it enters the head 14, and drips through the perforations therein on to the deflector 15, and thence trickles down over the inside of the inverted cone shaped coil 7 on to deflector 16 and over the inside of coil 7' in a similar manner, (and other cone coils if more are used), absorbing heat from the compressed air in the coils, and portions of the nitrogen of the liquid are evaporated thereby—as the nitrogen liquid evaporates at about 24 degrees lower temperature than the liquid oxygen. From the last or lower cone-shaped coil, the residue of the liquid drips into the vessel 1, the process being continued until the vessel is filled. Valve 12 is then partially opened by the hand wheel 12', and the compressed air from pipe 21 passes into the triple helical interchanger coils 6, and thence successively through the inverted cone-shaped coils 7 and 7' (and any other similar coils), to the submerged liquefying drum 9 and submerged coil 10, forcing the liquid air already liquefied therein, up through the siphon tube 11 through valve 12 into pipe 13 and the perforated head 14, where it drips out through said perforations on to the scalloped deflector 15, and down over the inside surfaces of cone-shaped coil 7, and thence on to scalloped deflector 16 and into and over the surfaces of the next lower cone-shaped coil, and finally the residue drips into the vessel 1, to replenish the evaporating liquid therein. Valve 28 may be kept partially opened, and the liquid therefrom from the outside source mixes with the liquid from pipe 13, in the perforated head 14, and the liquid air from both sources is distributed as one constant supply over the deflectors, and through the cone-shaped coils into vessel 1. The liquid air supplied to supply pipe 27 should be from a source a trifle higher than the perforated head 14, so as to insure a slight gravity fall to overcome any slight back pressure in the case or conduit 5. Both the liquid air from pipe 27, and that newly liquefied and forced up through pipe 13, absorb heat from the compressed air in the coil 7, and as the nitrogen evaporates therefrom it passes up around the outer scalloped edge of the deflector 15, and up through the perforations 15' in this deflector, and into the helical passages 19 and 19', and is utilized in cooling the incoming supply of compressed air in the triple helical coils 6 and 6', as it passes up into the nitrogen gas pipe 20, and through passage 19' in the drum O (see Fig. 2) and is discharged from the outlet pipe 20'; the remaining liquid drips from out the inverted cone-frustum shaped coil 7 on to the lower scalloped deflector 16, and thence on and down over the inside surfaces of the lower inverted cone-frustum shaped coil 7', where it passes down over said coil, absorbing more heat from the compressed air in said coils, and further evaporating the nitrogen, which passes up through and around the deflector 16, and into the cooling passage 19 as before. The upper deflector (15) is naturally colder than the lower deflector, as it distributes the liquid air before it has become distilled; and by having the nitrogen gas pass through the perforations (15') in this deflector, any trace of oxygen in the ascending nitrogen gas, will become condensed in passing through or around the scalloped edges of this cold deflector, or in contact with the colder spray and falling liquid therefrom and drip down with the other liquid.

As the difference in temperature between the air in coils 7' and the dripping liquid, is not so great as between the air in coils 7 and said liquid, the evaporation grows less active as the dripping liquid descends; this is a valuable feature, as it is desirable as the descending evaporating liquid becomes richer in oxygen, that the distillation should not be as intense, in order that none of the oxygen should evaporate. The liquid, now rich in oxygen, drips from the inside of the lower inverted-cone shaped coil, into the insulated vessel 1, serving to replenish the evaporating charge therein with liquid which is nearly pure oxygen. All of the vapor or evaporated nitrogen from the vessel 1, is carried up through the inverted-cone coils, into the helical low-pressure passages 19 and 19' and is all utilized in cooling the incoming compressed air in the triple helical coils 6 and 6'—these coils being of sufficient length so that the nitrogen as gathered from the outlet pipe 20', is practically of same temperature as the compressed air admitted to the pre-cooling drum O from pipe S (see Fig. 2).

Naturally, the compressed air delivered to the submerged liquefying drum 9 and submerged liquefying coil 10, having been cooled in the pre-cooling drum O, and in the interchanger cooling coils 6, by the cold outflowing nitrogen in the passages 19 and 19', and still further cooled in passing through the cone-shaped coils by the evaporating liquid dripping down over the inside surfaces of said cone-shaped coils, is quickly liquefied by the evaporating liquid substantially at atmospheric pressure in the receptacle 1 in which it is submerged.

Valve 24 may be left open when the operation is continuous, which is the preferred method, and the liquid oxygen may be collected from the spout 26. In case it is desired to separate the liquid in separate intermittent charges, after a sufficient time has elapsed to fill the vessel 1 with pure oxygen liquid, valves 28 and 30 may be closed, and valve 24 kept open, when the pressure generated in the conduit 5 will force out all the oxygen liquid in vessel 1 through the siphon tube 23, pipe 22 and spout 26.

In a continuous operation the purity of the oxygen liquid may practically be controlled by regulation of the supply valve 28—the less liquid air admitted through this valve, the more thorough will be the fractional distillation, and consequently the higher will be the percentage in oxygen of the liquid drawn from the liquid outlet 26.

When the apparatus is used as an air-liquefier and separator, the operation is practically the same as above outlined; the compression used, however, is much greater, or to substantially the critical pressure (or about 40 atmospheres instead of three or four atmospheres); and the release of the liquid air through valve 12 is to substantially atmospheric pressure. But the difference in pressure between the compressed air used and the liquid air after release, should not be so great as to cause solidification of the liquid air in the liquefying drum 9 and coil 10 in sub-cooling the same after liquefaction by the evaporating liquid in the insulated vessel 1.

When used as a liquefier of course valve 28 is closed, and the supply of liquid air from an outside source is dispensed with after the apparatus is charged; this initial charge of liquid air may be supplied through pipe 27 and valve 28, or it may be delivered to the evaporating vessel 1 through pipe 22 and valve 24 by means of the spout 26. In operating the apparatus as an air-liquefier and separator by means of the high compression named, the evaporation of each pound of liquid at atmospheric pressure by surface contact with the cone-shaped helical coils described and by direct contact with the liquefying drum 9 and coil 10, submerged in the liquid in the low-pressure evaporating vessel 1, will cool, liquefy and sub-cool about two pounds of air compressed to its critical pressure; so that the quantity of liquid or surplus product of the apparatus which may be drawn from the system through the overflow pipe 22, will be about one-half of all the air compressed. The advantage of this invention when used as a liquefier, however, is that the surplus liquid produced and drawn from the liquid outlet 22, if not drawn too rapidly (or if confined to about one-fifth of the total amount liquefied) will be almost pure oxygen liquid, and the gas saved from outlet pipe 20' will be almost entirely pure nitrogen gas.

Many changes might be made in the general form and arrangement of the parts described without departing from my invention, and therefore I do not restrict myself to the precise details set forth herein, but wish to be at liberty to make such changes as I deem desirable so long as I do not depart from the spirit and scope of my invention.

Having thus described my invention, what I claim as new and original and desire to secure by Letters Patent, is—

1. In an apparatus for the separation of liquid air into nitrogen gas and oxygen liquid, a compressed-air pipe a part of its length being coiled substantially in shape of a frustum of a cone; in operative combination with means for supplying compressed air to one end of said pipe; a liquid-air distributer at the other end; and a liquid-air pressure-releasing valve between said compressed-air supplying means and said liquid-air distributer.

2. In an apparatus for the separation of liquid air into nitrogen gas and oxygen liquid, a compressed-air pipe, a portion of which is coiled in shape substantially of a plurality of cone frustums; in operative combination with means for supplying compressed air to one end of said pipe; and means for delivering liquid air over said cone-shaped pipe coils at the other end; and a liquid-air pressure-releasing valve in said compressed-air pipe between said compressed-air supply and said means for delivering liquid air over said pipe coils.

3. A liquid-air separator, comprising in operative combination, an insulated low-pressure liquid-air evaporating vessel; a compressed-air liquefier arranged to be submerged in the low-pressure liquid gas evaporating in said vessel, and having a liquid-air outlet pipe; a liquid-air supply pipe arranged to receive liquid air for separation from an outside source; and a liquid-air distributer, arranged to receive liquid air from said outside source supply-pipe and said liquefier liquid-air outlet pipe and deliver the same to said evaporating vessel.

4. In an apparatus for liquefying air and separating the same into substantially nitrogen gas and oxygen liquid, a compressed air pipe helically coiled in shape substantially of the frustum of a cone; in operative combination with a deflector or liquid-air distributer, arranged to deliver the liquid air supplied thereto by gravity on to the upper part of said cone-shaped helical coil.

5. In an apparatus for the separation of liquid air into nitrogen and oxygen, a radially scalloped deflector or liquid air distributer having radial grooves thereon, in combination with a compressed-air pipe helically coiled in shape substantially of a frustum of a cone below said deflector, so arranged that the liquid air delivered to said deflector is discharged by gravity uniformly from the periphery of the same on to said cone-shaped pipe coil, dripping thereon substantially perpendicular to the column of compressed air passing through said coil.

6. In an apparatus for the separation of liquid air into oxygen and nitrogen, a liquid air deflector, slightly convex on the upper side, and having radial ridges thereon and openings in the apex of said ridges.

7. In an apparatus for liquefying atmospheric air, and separating the same into its constituents, oxygen and nitrogen, a deflector or liquid-air distributer having grooves or channels on the upper surface thereof, and openings or perforations on the ridges between said grooves or channels; in combination with a compressed air pipe helically coiled in shape substantially of the frustum of a cone located below said perforated deflector.

8. In an apparatus for liquefying atmospheric air and separating the same into its constituents, oxygen and nitrogen, the combination of a helically coiled pipe in a casing or rectifying column, and a low-pressure liquid gas evaporating vessel below the same; with a high-pressure holder or submerged air-liquefying conduit within said vessel, connected to or fed from said helically coiled pipe; means for supplying said coiled pipe with compressed air; and means for delivering liquid air on to the surfaces of said helical coils, and causing the same to flow from coil to coil successively by gravity down over said coils, thereby bringing the same liquid successively in contact with different parts of said helically coiled pipe.

9. In an apparatus for liquefying atmospheric air and separating the same into its constituents, oxygen and nitrogen, the combination of a helically coiled pipe in a casing or rectifying column, and a low-pressure liquid gas evaporating vessel below the same; with a high-pressure holder or submerged air liquefying conduit within said vessel, connected to or fed from said helically coiled pipe; means for supplying said coiled pipe with compressed air; and means for delivering liquid air on to the surfaces of said helical coils, and causing the same to flow from coil to coil successively by gravity down over said coils, thereby bringing the same liquid successively in contact with different parts of said helically coiled pipe, and thereby causing fractional distillation of said liquid air, and liquefaction of the compressed air in said helically coiled pipe.

10. In an apparatus for liquefying air and separating the same into its constituents, oxygen and nitrogen; the combination of means for liquefying air under pressure in a helically coiled pipe; and means for passing the air thus liquefied under pressure in said pipe, through a conduit or drum submerged in the residue of the released liquid after partial fractional distillation thereof.

11. An apparatus for liquefying air and separating it into oxygen and nitrogen, comprising a liquefier consisting of two sections, one located above the other; in combination with means for passing the air liquefied therein down over the upper section by gravity, and thereby evaporating a portion thereof; and means for submerging the lower section of said liquefier in the unevaporated portion or residue of said liquid.

12. In an apparatus for liquefying air and separating the same into oxygen and nitrogen, means for conducting compressed air through a horizontally and helically coiled pipe; in combination with means for passing liquefied air by gravity down over said horizontally and helically coiled pipe, successively across and in contact with said helical coils of said pipe and substantially perpendicular thereto.

13. In an apparatus for liquefying air and separating the same into oxygen and nitrogen, a cone-shaped helical pipe coil, arranged to conduct therethrough compressed gaseous air; in combination with means for passing liquefied air by gravity down over one side of the surfaces of said cone-shaped helical pipe coil, and successively across and in contact with the different helical coils thereof.

14. In an apparatus for liquefying air and separating the same into oxygen and nitrogen, a helical pipe coil, arranged to conduct therethrough compressed gaseous air; in combination with means for passing by gravity the air liquefied therein, down over one side of the surfaces of said coil, and thereby bringing same successively in contact with the different helical coils of said cone-shaped coil of pipe.

15. In an apparatus for liquefying air and separating the same into oxygen and nitrogen, a cone-shaped helical pipe coil, arranged for compressed air to be conducted therethrough; in combination with means for releasing to a lower pressure the air liquefied therein, and causing the said released liquid to drip down successively over and in contact with the different helical coils of said cone-shaped coil.

16. In an apparatus for liquefying air and separating the same into oxygen and nitrogen, a pipe helically coiled in form substantially of a frustum of a cone, and arranged for conducting therethrough compressed air; in combination with means for causing liquefied air to drip by gravity down over and successively in contact with the different helical coils of said pipe substantially perpendicular or at right angles to the moving column of compressed air passing through the same.

17. In an apparatus of the character described, the combination of a compressed air pipe having a group of coils therein, a chamber within which such coil group is situated, means for supplying air under compression to said pipe, and means situated in a plane above said coil group for distributing liquid air from one end of said pipe, which liquid by the action of gravity is brought into contact with said coil group.

18. In an apparatus of the character described, the combination of a compressed air pipe including intermediate its ends a plurality of coil groups, one group being arranged above the other, means for supplying air under compression to said pipe including the said coil groups, and means situated above the first of said coil groups and also intermediate the remaining groups for causing a distribution of liquid air over the coils in the respective groups.

19. In an apparatus of the character described, the combination of a compressed air pipe having coils therein in vertical arrangement with respect to each other and the said pipe also having a receptacle interposed between its ends, the said receptacle having connection with the lowermost of the said coils, means for supplying air under compression to the said pipe, means for distributing liquid air over the said coils, and means for supplying liquid air from the said receptacle to the said distributing means.

20. In an apparatus of the character described, the combination of a compressed air pipe a portion of which is coiled to form a plurality of groups of coils each being of substantially the shape of the frustum of a cone, the said groups of coils being situated one above the other, means for supplying air under compression to said pipe, and means for delivering liquid air of substantially atmospheric pressure over the said groups of coils.

21. In an apparatus of the character described, the combination of a compressed air pipe, the said pipe including a portion having a plurality of coils therein as well as a receptacle for the reception of liquid air formed in the said coils, a chamber within which the said coils and receptacle are situated, means for supplying air under compression to the said pipe and forcing the same through the said coil into the said receptacle, a branch coil having connection with the said pipe and surrounding the said receptacle, means for distributing liquid air over the said coils, and means for supplying liquid air from the said receptacle and the coil surrounding the same to the said distributing means.

22. In an apparatus for the liquefaction and separation of gases, the combination of a chamber, a coil in said chamber for receiving compressed gas and in which liquefaction takes place, means for supplying compressed air thereto, a receptacle for receiving the liquid produced in said coil, and means for conveying the liquid thus received from said receptacle and causing it to contact with the exterior of said coil.

23. In an apparatus for the liquefaction and partial separation of a gas into its constituent parts, a chamber in which such liquefaction and separation are effected, coils for receiving compressed gas and in which liquefaction takes place, means for supplying said compressed gas thereto, a receptacle for receiving the liquid from said coils, and means for conveying the liquid from said receptacle and causing it to contact with said coils whereby distillation of the same is facilitated.

Signed at New York, in the county of New York and State of New York, this 30th day of December, A. D. 1907.

JAMES F. PLACE.

Witnesses:
JOHN A. INSLEE,
BRONSON P. REYNOLDS.